United States Patent [19]
Chen et al.

[11] Patent Number: 5,754,719
[45] Date of Patent: May 19, 1998

[54] METHOD FOR COUPLING LIGHT FROM SINGLE FIBEROPTIC TO A MULTI-FIBER BUNDLE WITH ENHANCED FIELD UNIFORMITY AND BETTER COUPLING EFFICIENCY

[75] Inventors: Chingfa Chen, West Covina; Kenneth K. Li, Arcadia; Douglas M. Brenner, Los Angeles, all of Calif.

[73] Assignee: Cogent Light Technologies, Inc., Santa Clarita, Calif.

[21] Appl. No.: 753,299

[22] Filed: Nov. 22, 1996

[51] Int. Cl.$^6$ ................................................ G02B 6/32
[52] U.S. Cl. ........................................................ 385/34
[58] Field of Search .............................. 385/33, 34, 117, 385/119; 355/67, 70, 71; 600/177, 182; 356/359, 345; 359/389, 368, 385; 396/431; 362/32, 105, 277, 335

[56] References Cited

U.S. PATENT DOCUMENTS

| | | | |
|---|---|---|---|
| 4,017,150 | 4/1977 | Imai | 385/119 |
| 4,415,240 | 11/1983 | Nishioka et al. | 385/33 |
| 4,461,538 | 7/1984 | Breed, III et al. | |
| 4,610,513 | 9/1986 | Nishioka et al. | 385/33 |
| 4,639,077 | 1/1987 | Dobler | |
| 4,736,734 | 4/1988 | Matsuura et al. | 600/177 |
| 4,773,723 | 9/1988 | Cuda | |
| 4,944,567 | 7/1990 | Kuper et al. | |
| 4,953,937 | 9/1990 | Kikuchi et al. | 385/33 |
| 5,016,963 | 5/1991 | Pan | |
| 5,094,518 | 3/1992 | Musk | |
| 5,109,466 | 4/1992 | Seike et al. | |
| 5,179,610 | 1/1993 | Milburn et al. | |
| 5,274,723 | 12/1993 | Komatsu | |
| 5,539,485 | 7/1996 | White | 355/67 |
| 5,570,228 | 10/1996 | Greenberg | 359/385 |
| 5,596,666 | 1/1997 | Iyano et al. | 385/118 |
| 5,604,550 | 2/1997 | White | 355/67 |
| 5,633,714 | 5/1997 | Nyyssonen | 356/359 |

FOREIGN PATENT DOCUMENTS

| | | |
|---|---|---|
| 0251623 | 1/1988 | European Pat. Off. |
| 0361751 | 4/1990 | European Pat. Off. |
| 62-10608 | 1/1987 | Japan |
| 2143207 | 6/1990 | Japan |
| 9535517 | 12/1995 | WIPO |
| 9705510 | 2/1997 | WIPO |

*Primary Examiner*—Akm E. Ullah
*Attorney, Agent, or Firm*—Rothwell, Figg, Ernst & Kurz, p.c.

[57] ABSTRACT

A device which adjusts the angle of illumination of light exiting a fiber optic light guide. A first light guide has a first numerical aperture for emitting light from a light source, and light exiting the first light guide has a first light intensity angular profile. A second light guide has a second numerical aperture for receiving the light from the first light guide, and light exiting the second light guide has a second light intensity angular profile. Light from the first light guide is dispersed by a device including at least a first surface interposed between the first light guide and the second light guide such that light from the first light guide having the first light intensity profile irradiates the first surface and the angular intensity profile of the light irradiating the second light guide is modified so as to cause the second light intensity angular profile to be modified. The first light guide preferably has a single fiber, and the second light guide preferably has a fiber bundle. The dispersion is preferably be effected with a GRIN lens and a fiber bundle having an angled endface, or with a GRIN lens, a fixed fiber bundle having an angled endface and a rotatable fiber bundle having an angled endface.

24 Claims, 2 Drawing Sheets

METHOD FOR COUPLING LIGHT FROM SINGLE FIBEROPTIC TO A MULTI-FIBER BUNDLE WITH ENHANCED FIELD UNIFORMITY AND BETTER COUPLING EFFICIENCY

BACKGROUND OF THE INVENTION

1. Field of the Invention

The present invention relates to a method and apparatus for coupling light from a first fiberoptic to a second fiberoptic, and, in particular, to a method and apparatus for coupling light from a single fiber optic to a multi-fiber bundle, such as of an endoscope.

2. Description of the Background Art

The following description of the background art represents the present inventors' knowledge of the functions, uses, problems, etc., associated with the background art and not necessarily that known by those in the art.

Coupling between light sources and endoscopes (both flexible and rigid types for both industrial and medical applications) is commonly performed with fiber bundle cables. This type of cable includes thousands of small diameter fibers inside a jacket. It is heavy in weight and each individual fiber is fragile and can easily be broken inside the cable during normal handling and cleaning. The light transmission efficiency of the cable is also relatively low, depending on the cable length, the fiber packing factor and the number of broken fibers inside the cable.

The output intensity profile of an endoscope, for example, depends in part on two factors: the distribution of illumination at the distal end of the endoscope and the coupling between the endoscope and the fiber bundle cable. A figure of merit against which performance can be measured is the degree of uniformity of illumination over the field of view of the endoscope. A perfectly uniform field would have an intensity profile that would be flat from edge to edge across the field of view. Whether a field is flat in part depends on the method of observation. Generally, endoscopes are used with video cameras for which the gain is greater in the center than at the edges. Hence, a uniform field as observed through a video camera equates with an actual intensity distribution which is slightly lower in the center than at the edges of the field of view (e.g. a "donut distribution", discussed below).

In reality, achieving such a profile is difficult because most fiber bundles, e.g. internal to an endoscope, have a randomized packing of fibers. To the extent that the fibers are not randomized, it is possible to create a "donut distribution" (discussed below) if the light delivered to the endoscope is similarly distributed. For endoscopes that have a randomized fiber bundle, a flatly illuminated field requires that the input to the endoscope also be uniform.

Many endoscopes include light concentrating cones at the input end of the endoscope which are designed to concentrate light from a larger diameter to a smaller diameter focus to match the diameter of the internal bundle. In the process, the numerical aperture (NA) of light increases and light is lost unless the fibers inside of the endoscope have a NA large enough to accept the increased NA of the focused light from the concentrating cone. Creating a uniform field when a concentrating cone is present at the input of the endoscope involves different requirements for delivering a uniformly illuminated field at the distal end. In this case, the uniformity depends both on the characteristics of the cone and the degree of randomization of internal fibers.

To the extent that the diameter of a fiber bundle light delivery cable matches that of a light post, or the like, the intensity profile of the illuminated field of view depends on the characteristics described above. When the light delivery system is a single fiber having a diameter of about 1-mm, or smaller, additional considerations apply. In general, the light from a single fiber needs to be expanded to match the diameter of a light post, or the like. In addition, the intensity profile requires modification so as not to cause thermal damage to the light post. If a cone is involved to concentrate light into a smaller fiber bundle, the output of the single fiber should be adjusted to match the optical performance of the cone.

SUMMARY OF THE INVENTION

According to the present invention, an apparatus is provided which modifies the light intensity profile of a fiber optic before it is coupled into, for example, an endoscope. Two notable attributes of the invention include that: (a) the output can be expanded to match the diameter of an input light post of an endoscope or other fiber bundle device; and (b) the intensity profile of the expanded beam can be modified to match that consistent with the focusing properties of a concentrating cone.

According to one aspect of the invention, a device for adjusting the angle of illumination of light exiting a fiber optic light guide, is provided which includes: a first light guide having a first numerical aperture for emitting light from a light source, light exiting the first light guide having a first light intensity angular profile; a second light guide having a second numerical aperture for receiving the light from the first light guide, light exiting the second light guide having a second light intensity angular profile; and a light-dispersing member for dispersing light from the first light guide with at least a first surface interposed between the first light guide and the second light guide such that light from the first light guide having the first light intensity profile irradiates the first surface and the angular intensity profile of the light irradiating the second light guide is modified so as to redistribute the light of the intensity angular profile from the center of the second profile to the perimeter of the second profile.

According to another aspect of the invention, a method of adjusting the angle of illumination of light exiting a fiber optic light guide, includes the steps of: a) sending light from a light source through a first light guide having a first numerical aperture with the light exiting said first light guide having a first light intensity angular profile; b) receiving the light exiting the first light guide with a second light guide having a second numerical aperture with light exiting the second light guide having a second light intensity angular profile; and c) dispersing light from the first light guide with at least a first surface interposed between the first light guide and the second light guide such that light from the first light guide having the first light intensity profile irradiates the first surface and the angular intensity profile of the light irradiating the second light guide is modified so as to redistribute the light of the intensity angular profile from the center of the second profile to the perimeter of the second profile.

According to another aspect of the invention, the light-dispersing member includes a GRIN lens and a fiber bundle having an angled endface.

According to an alternative aspect of the invention, the light-dispersing member includes a GRIN lens, a fixed fiber bundle having an angled endface and a rotatable fiber bundle having an angled endface.

According to another aspect of the invention, the first light guide preferably is a single fiber; alternatively, the first light guide can be a fiber bundle. Similarly, according to another aspect of the invention, the second light guide preferably has a fiber bundle.

Among other advantages, the present invention provides an improved method for coupling, for example, light from a single fiberoptic to a multi-fiber bundle with enhanced field uniformity and better coupling efficiency. The above and other advantages, features and aspects of the invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which:

FIG. 4 is a somewhat schematic side view of an alternative third embodiment of the invention having a source fiber output angled to an input of the input of an endoscope, or the like.

DESCRIPTION OF THE PREFERRED EMBODIMENTS

Figure 1:
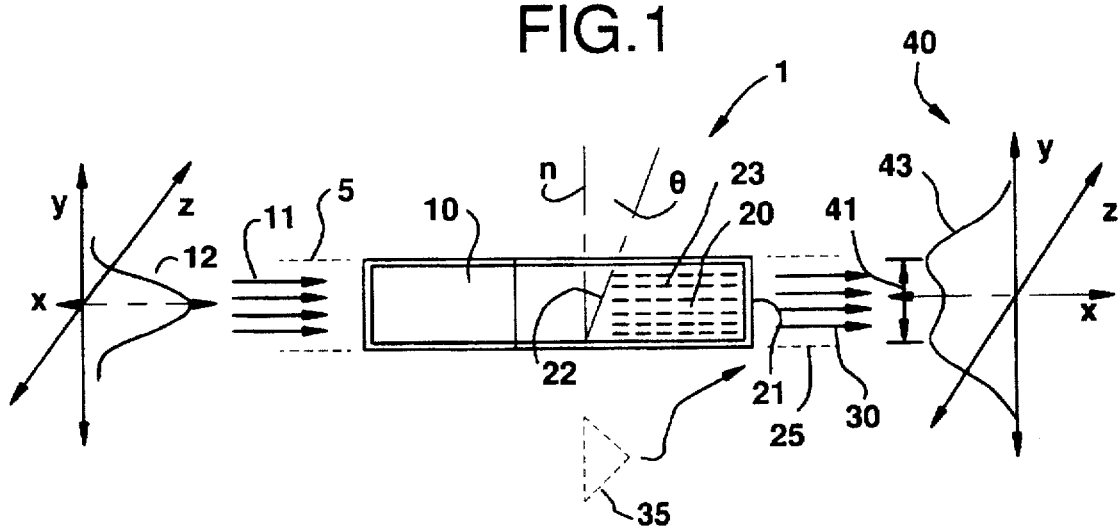
FIG. 1 is an explanatory, somewhat schematic, side view of a first embodiment of the invention showing the arrangement of parts and intensity profiles of light transmitted through such parts.

Expansion of the beam 11 from a first light guide 5 having an intensity profile 12, for example, may be accomplished with a lens matched to the NA of the input 25 of, for example, an endoscope. In the preferred embodiment, a collimating optic, such as a Gradient Index Rod Lens (GRIN lens) 10, expands the beam 11. The actual spacing between the GRIN lens 10 and the input of the endoscope, which can be appropriately selected, permits matching the diameter of the light post to that of the light beam. By itself, a GRIN lens 10 is adequate, but not optimized for uniform output for coupling light into a fiber bundle for nearly any configuration of fibers at the distal end of an endoscope. However, for endoscopes having a concentrating cone, the small NA (i.e., low divergence angle of the light) does not match the needed input intensity profile of the cone to produce a concentrated beam large enough to fill the internal bundle of the endoscope. The result is a non-uniform intensity profile at the distal end of the scope.

Figure 2:
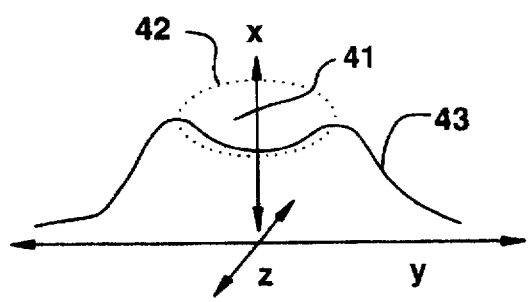
FIG. 2 is a diagram of the exiting light intensity profile, such as shown at the right side of FIG. 1.

The present invention avoids the above problem by the inclusion of a second optical element which diffuses light to larger angles. Preferably, to reproduce the far field intensity profile of a fiber bundle, the second optic should redistribute the Gaussian profile to create a uniform or "donut intensity profile." This is accomplished in the preferred embodiment with a short section of a fused fiber bundle 20, effectively a fused rod. The fused rod 20 is flat-polished, e.g. has a perpendicular surface, on the output end 21 and is angle-polished on the input end 22, as shown in the FIG. 1. The fused fiber rod 20 includes thousands of small diameter fibers 23, in which each fiber samples only a small portion of the incoming light beam. The angle θ of the angle polished end 22 causes the collimated light from the GRIN lens to have an effective angle of incidence that is greater than that emitted from the GRIN lens, causing more light output therefrom to be spread to the periphery of the output beam, creating a "donut intensity profile" 40. Hence, at the rod output endface 21, the light from each fiber of the fused rod is reassembled to produce a donut shape profile 43. As shown in FIGS. 1 and 2, the profile 43 is generally symmetrical around the center axis X such that a depressed center 41 is situated within a peak intensity ring or donut 42. The size of the depressed center depends on the light beam incident angle θ at the rod input endface 22. Hence, by adjusting the incident angle of the fused rod, the output intensity profile can be modified from a typical Gaussian profile, to a relatively flat profile, or to a donut-shaped profile. By changing the angle, the present invention is capable of creating a variety of intensity profiles at the output of the second light guide. In an alternative embodiment, the fused fiber bundle can be replaced with, for example, a cladded rod, flat polished on the output end and angle polished on the input end. A light concentrating cone, shown schematically at 35 in FIG. 1 can also be interposed between the second light guide 25 and the light dispersing member.

As shown in FIGS. 1 and 2, the angle θ of the endface 22 of the fused fiber bundle will determine the extent to which the intensity profile 43 is modified. In an embodiment discussed below, the angle is set at about 24°; however, this is merely one exemplary embodiment and concepts of the present invention can be applied using a broad range of angles. Although it is possible to find an angle θ that is nearly optimal for most fiber bundle configurations inside endoscopes, it is also possible to create an adjustable profile to optimize the intensity profile for each particular fiber bundle.

Figure 3:
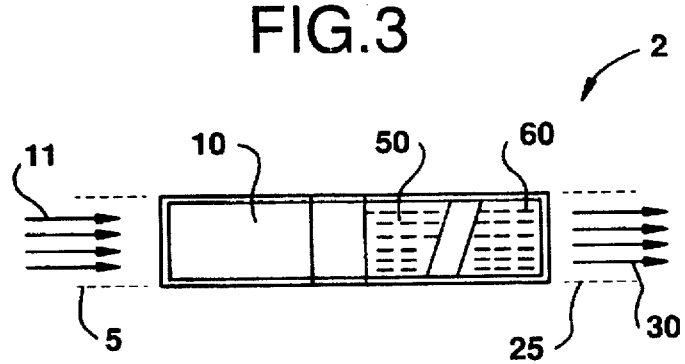
FIG. 3 is an explanatory side view of a second embodiment of the invention having a variable intensity profile output.

In this regard, a second embodiment of the invention is shown in FIG. 3, wherein a device 2 is constructed to create a variable intensity profile. The preferred construction of the second embodiment replaces the single angle-polished fused fiber rod with two similar rods 50 and 60. By rotating one rod relative to the other, the light beam incident angle can be adjusted to match that of the second fused fiber rod, as desired. In this manner, the degree to which the center of the intensity profile is decreased can be varied accordingly. This results in an intensity profile ranging from a Gaussian profile to a donut profile in which the center is severely depressed in intensity.

Figure 4:
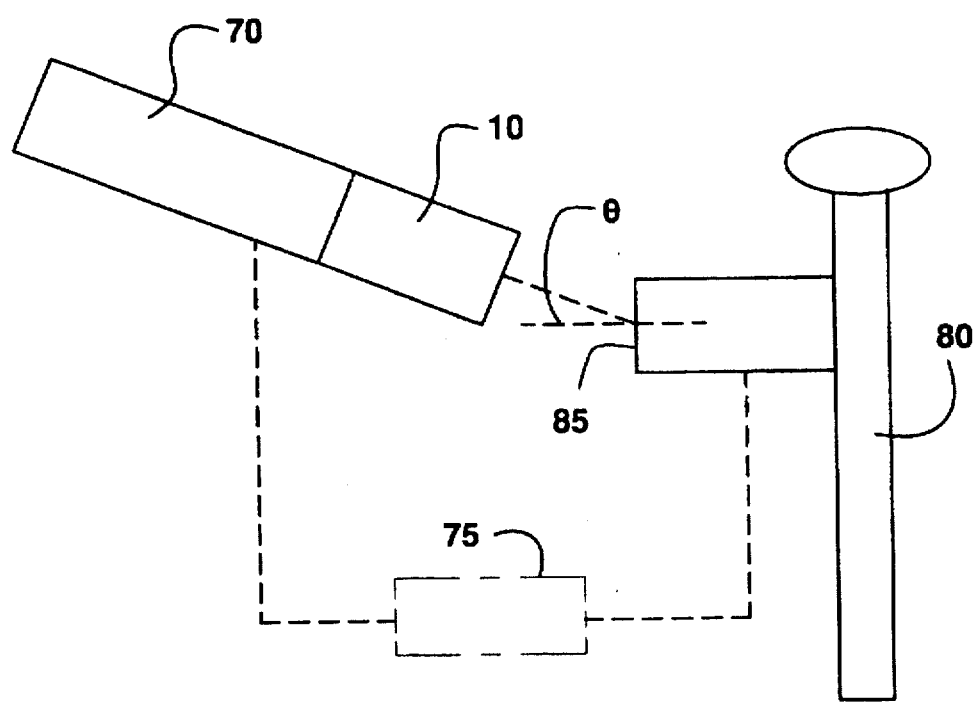
Figure 4:
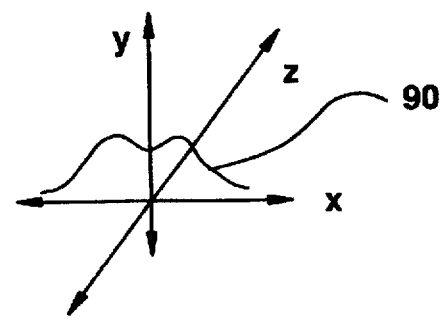

According to a third embodiment of the invention, shown in FIG. 4, a GRIN lens 10 at the output of a source fiber 70 is set at an angle θ to an input 85 (e.g. bundle of fibers with or without an intermediary cone) of an endoscope 80, or the like. By varying the angle θ, the device can produce an intensity profile output 90 which is similar to the profile 43. A support connector 75 can be included to maintain the angle θ, as desired. The support connector can also include means for adjusting the angle θ. The support connector can be selected from any known support, as long as the angle is properly maintained in accordance with the invention.

According to one preferred construction, the GRIN lens is a cylindrical lens with a parabolic refractive index distribution. By putting the fiber source tip against the input surface of the GRIN lens, the output beam is thereby substantially collimated. An angle-polished fiber bundle (which is fused) is then positioned an appropriate distance such that it matches the size (e.g. diameter) of the output beam from the GRIN lens.

One exemplary embodiment includes a) a GRIN lens having a diameter of 1.8 mm and a length of 3.6 mm (0.25 pitch), with a numerical aperture of 0.6, and b) a fused fiber bundle having a diameter of 4.2 mm, a length of 7 mm, a numerical aperture of 0.66, a polished angle θ of about 24° from the normal n, and each fiber in the bundle having a diameter of 10 μm. As one example, the GRIN lens can be a SELFOC lens of NSG America, Inc., Somerset, N.J. As should be understood, the dimensions, numerical aperture, etc., above are for exemplary purposes only and can be changed, as desired, according to particular requirements.

The light transmission efficiency primarily depends on the numerical aperture (NA) mismatch of components and the fiber packing factor of the fused fiber rod. By selecting the matched components and a high packing factor rod, a high light transmission efficiency can be achieved of at least 80%.

While the present invention has been shown and described with reference to preferred embodiments presently contemplated as best modes for carrying out the invention, it should be understood that various changes may be made in adapting the invention to different embodiments without departing from the broader inventive concepts disclosed herein and comprehended by the claims which follow.

We claim:

1. A device for redistributing the angle of illumination of light exiting a fiber optic light guide, comprising:

a first light guide having a first numerical aperture for emitting light from a light source, light exiting said first light guide having a first light intensity angular profile;

a second light guide having a second numerical aperture for receiving the light from the first light guide, light exiting said second light guide having a second light intensity angular profile; and a light-dispersing member for dispersing light from said first light guide with at least a first surface interposed between said first light guide and said second light guide such that light from said first light guide having said first light intensity profile irradiates said first surface and the angular intensity profile of the light irradiating said second light guide is modified so as to redistribute the light of the intensity angular profile from the center of said second profile to the perimeter of said second profile.

2. The device of claim 1, wherein said second profile is generally flat.

3. The device of claim 1, wherein said second profile has a depressed center.

4. The device of claim 1, wherein said light dispersion member includes a fiber bundle having at least one angular endface.

5. The device of claim 4, wherein said bundle is fused.

6. The device of claim 1, wherein said first light guide is a single fiberoptic.

7. The device of claim 1, wherein said first light guide is a fiber bundle.

8. The device of claim 1, wherein said light-dispersing member includes a GRIN lens and a fiber bundle having at least one angular endface.

9. The device of claim 8, wherein said fiber bundle having at least one angular endface is fused.

10. The device of claim 1, wherein said light-dispersing member includes a GRIN lens, a fixed fiber bundle having an angled endface, and a rotatable fiber bundle having an angled endface adjusted to said angled endface of said fixed fiber bundle.

11. The device of claim 10, wherein said fixed and rotatable fiber bundles are fused.

12. The device of claim 1, wherein said second light guide is a fiber bundle.

13. The device of claim 12, wherein a light concentrating cone is interposed between said second light guide and said light-dispersing member.

14. The device of claim 12, wherein the said fiber bundle is part of an endoscope.

15. A method of adjusting the angle of illumination of light exiting a fiber optic light guide, comprising the steps of:

a) sending light from a light source through a first light guide having a first numerical aperture with the light exiting said first light guide having a first light intensity angular profile;

b) receiving the light exiting the first light guide with a second light guide having a second numerical aperture with light exiting said second light guide having a second light intensity angular profile; and c) dispersing light from the first light guide with at least a first surface interposed between the first light guide and the second light guide such that light from the first light guide having the first light intensity profile irradiates the first surface and the angular intensity profile of the light irradiating the second light guide is modified so as to redistribute the light of the intensity angular profile from the center of the second profile to the perimeter of the second profile.

16. The method of claim 15, wherein said step of sending light from a light source through a first light guide includes sending the light through a single fiberoptic.

17. The method of claim 15, wherein said step of sending light from a light source through a first light guide includes sending the light through a fiber bundle.

18. The method of claim 15, wherein said step of dispersing is performed with a GRIN lens and a fiber bundle having an angled endface.

19. The method of claim 15, wherein said step of dispersing is performed with a GRIN lens and a fixed fiber bundle having an angled endface and a rotatable fiber bundle having an angled endface.

20. The method of claim 1, wherein said step of receiving the light exiting the first light guide with a second light guide includes providing the second light guide with a fiber bundle.

21. The method of claim 1, wherein said step of receiving the light exiting the first light guide with a second light guide includes providing the second light guide with a single fiberoptic.

22. The method of claim 20, wherein said fiber bundle is provided as part of an endoscope.

23. A device for redistributing the angle of illumination of light exiting a fiber optic light guide, comprising:

a first light guide having a first numerical aperture for emitting light from a light source, light exiting said first light guide having a first light intensity angular profile;

a second light guide having a second numerical aperture for receiving the light from the first light guide, light exiting said second light guide having a second light intensity angular profile;

a GRIN lens axially aligned at the output end of said first light guide; and a support connector which maintains said first light guide and said gradient index lens at a predetermined angular orientation to said second light guide such that light from said first light guide having said first light intensity profile is modified so as to redistribute the light of the intensity angular profile from the center of said second profile to the perimeter of said second profile.

24. The device of claim 23, wherein said support connector includes means for adjusting said angular orientation so that the angular orientation can be varied.

* * * * *